United States Patent [19]

Pasley et al.

[11] Patent Number: 6,058,793

[45] Date of Patent: May 9, 2000

[54] PARALLEL SHAFT SPEED REDUCER WITH SUMP AND DRY WELL

[75] Inventors: Stephen A. Pasley; Ronald G. Stogdill, both of Springboro, Ohio

[73] Assignee: Chemineer, Inc., Dayton, Ohio

[21] Appl. No.: 09/233,410

[22] Filed: Jan. 19, 1999

[51] Int. Cl.[7] .............................. F16H 1/22; F16H 57/02; F16H 57/04

[52] U.S. Cl. ........................ 74/421 A; 74/606 R; 74/467; 184/6.12; 366/283

[58] Field of Search ............................. 74/421 R, 421 A, 74/467, 606 R; 184/6.12; 366/283; 416/170 R

[56] References Cited

U.S. PATENT DOCUMENTS

| | | | |
|---|---|---|---|
| 1,220,813 | 3/1917 | Alquist . | |
| 1,737,567 | 12/1929 | Buehler . | |
| 2,441,446 | 5/1948 | Schmitter | 74/421 A X |
| 2,869,384 | 1/1959 | Schmitter | 74/420 |
| 3,095,063 | 6/1963 | Eskenazi | 184/6 |
| 3,259,210 | 7/1966 | Beebe et al. | 184/6 |
| 3,286,994 | 11/1966 | Manna | 74/325 |
| 3,860,844 | 1/1975 | Hetzel | 310/104 |
| 3,915,034 | 10/1975 | Ward | 184/6.12 X |
| 4,068,740 | 1/1978 | Quinn et al. | 184/6.12 |
| 4,721,003 | 1/1988 | Hutchings et al. | 74/421 |
| 4,800,771 | 1/1989 | Edwards et al. | 74/467 |
| 5,053,661 | 10/1991 | Kitamura et al. | 74/467 X |
| 5,203,221 | 4/1993 | Logsdon | 74/421 R |
| 5,960,671 | 10/1999 | Nguyen | 74/421 A X |

OTHER PUBLICATIONS

Product Literature for the UniFirst 4000 Drive from Philadelphia Mixers.

Chemineer Product Literature "HT Turbine Agitators" 1998.

Chemineer Product Literature HTN/HTNS Turbine Agitators Installation, Operation Maintenance Manual, 1995.

Product Literature "Falk Reducers Ram Mixer" May 1993.

Product Literature Lightnin Mixers and Aerators Outline Dimensions in Millimeters Model 98RR, Nov., 1996.

Product Literature, "At last the innovative Series 10 by Lightnin", 1990.

Product Literature, "Lightnin Mixers and Aerators Assembly Drawing Series 10, Unit Size 14, 15 & 16 Open Tank Mixer", 1996.

Product Literature "LIGHTNIN Series 10 Mixers", 1997.

*Primary Examiner*—Charles A Marmor
*Assistant Examiner*—Ankur Parekh
*Attorney, Agent, or Firm*—Thompson Hine & Flory LLP

[57] ABSTRACT

A speed reducer for a mixing apparatus having a gear train mounted within a housing such that the output shaft is supported by upper and lower bearings mounted within the upper portion and base of the housing, respectively. The lower output shaft bearing preferably is mounted within a recess in the underside of the housing base below a dry well containing the output shaft. The dry well forms a lubricant sump within the housing and preferably is unitary with the housing base. By placing the output shaft bearing below the dry well in the base of the housing, the diameter of the bearing can be increased to bear larger loads without being restricted by the dry well and is better able to transmit bending and radial loads to a relatively massive portion of the housing, and is placed closer to the load, thereby minimizing the amount of unsupported output shaft projecting from the reducer.

25 Claims, 2 Drawing Sheets

PARALLEL SHAFT SPEED REDUCER WITH SUMP AND DRY WELL

BACKGROUND

The present invention relates to gear driven speed reducers, and more particularly, to parallel shaft, double stage speed reducers primarily used with electric drive motors in mixer assemblies.

Speed reducers, known simply as "reducers," are attached to the output shaft of an electric drive motor to provide a low speed, high torque output shaft. Such reducers typically are interposed between the electric drive motor and the shaft of an impeller in a low speed mixer. One type of reducer comprises a housing having a plurality of parallel, vertically-oriented shafts, each carrying a gear. An input shaft is connected to the output shaft of the electric drive motor, and its gear meshes with a larger diameter gear on an intermediate shaft. A smaller gear on that intermediate shaft meshes with a large diameter ring gear connected to an output shaft. This low speed ring gear is mounted on a flange so that it extends below the lubricant level in the housing.

Typically, a cylindrical dry well is formed in the housing and surrounds the output shaft. This dry well forms a lubrication sump with the housing. Bearings and gears not able to be positioned within the lubrication sump are lubricated by "splash" lubrication or by use of a pump mechanism, which pumps lubricant to such exposed bearings and gears.

With such lubrication systems, steps must be taken to prevent the lubricant from leaving the lubrication sump and possibly fouling the materials being mixed by the associated impeller. Likewise, steps must be taken to prevent the materials being mixed, or other environmental liquids or solids, from entering into the gearbox and thereby contaminating the lubrication fluid. For these reasons, many conventional reduction drive assemblies incorporate complicated seal and dry-well systems with the output shaft assembly.

Additionally, to withstand loading in the range of 10,000 in-lb of torque and 20,000 in-lb of bending moment, the output shaft of a drive assembly should be high strength steel, typically 2 to 3 inches in diameter. With such a large diameter output shaft, the diameter of the coupling should be on the order of 2½ times the shaft diameter. A difficulty with providing such a large diameter output shaft and coupling is that the drive assembly must incorporate the dry-well about the shaft and lower, low-speed output shaft bearing, while still fitting the dry well under the gear attached to the output shaft. Another problem is that it is difficult to design such a reduction assembly where the low-speed bearing and/or the dry-well will not interfere with the supports and bearings for the output drive shaft and intermediate pinion. If the pinion on the intermediate shaft needs to be raised to accommodate the large dry-well and associated low-speed bearings, there is a difficulty in lubricating the upper bearing on the intermediate shaft with the sump oil, without incorporating complicated lubrication pumping mechanisms. Accordingly, most vertical parallel shaft reducers with dry-well seals lubricate the gear mesh by means of an oil pump. A disadvantage with such a design is that the oil pump not only adds a degree of complexity to the drive but also reduces reliability.

Furthermore, to accommodate dry-wells large enough to surround the large output shaft and bearing assembly, many conventional drive assemblies separately press the dry-well into place and glue the components closed. Therefore, such conventional drive assemblies must rely on tolerances on the separate dry-well to be sufficiently close and that the adhesive will not fail.

Another problem with conventional reduction drive assemblies is that many conventional drive assemblies place the upper, and/or lower low-speed bearings against portions of the gearbox, such as the dry-well, that do not have substantial strength. Therefore, it has been known in mixing applications with high bending loads that these portions of the gearbox bearing such bending loads from the output shaft and associated low-speed bearings have been known to fail.

SUMMARY

The present invention is a speed reducer which is specially designed for use with a mixer, and which is designed to withstand large bending loads and upward thrust loads often transmitted to the output shaft in such applications, in combination with providing a relatively uncomplicated and reliable lubrication and sealing system. The orientation of components of the present invention enables the reducer to bear relatively high loads with a relatively small footprint, in comparison to prior art reducers.

In a preferred embodiment of the present invention, the reducer is a parallel shaft, double reduction speed reducer having a two piece housing comprised of a relatively thick base or floor and an upper portion, together defining a gearbox having a lubrication sump. An input drive shaft adapted to be driven by an electric drive motor, an intermediate shaft driven by the input shaft, and a relatively low speed, high torque solid output shaft driven in turn by the intermediate shaft are rotatably mounted within the gearbox. All the shafts are oriented substantially parallel to each other and vertically within the gearbox, and the housing includes a boss to which a drive motor is mounted vertically above the input shaft. The shafts each carry appropriately sized pinion gears which mesh to transfer power from a drive motor to the output shaft. However, it is within the scope of the present invention to provide a reducer having only two shafts, an input shaft and an output shaft meshing with and driven directly by the input shaft.

The output shaft is positioned within the gearbox to extend downwardly and outwardly through an opening formed in the housing base. The housing base includes a substantially cylindrical dry well extending upwardly into the gearbox from the hole and which is shaped to receive the output shaft therethrough. The input and intermediate shafts preferably are supported within the gearbox by bearings, all of which are positioned in a lubricant bath within the gearbox. The output shaft includes a downwardly-angled gear hub which supports a ring gear driven by a pinion on the intermediate shaft so that the output shaft ring gear extends below the lubricant level in the gearbox. The dry well is concentric with the ring gear and extends within the output shaft gear hub to form a labyrinth seal with the gear hub above the level of lubricant in the gearbox to prevent lubricant from flowing out of the output shaft hole in the base. For ease of manufacture and strength, the dry well is cast into, and is unitary with the base.

The output shaft is supported by upper and lower low speed bearings. The upper low speed bearing extends between the upper end of the output shaft and the upper portion of the housing above the lubricant level in the gearbox. The upper low speed bearing preferably is a tapered roller bearing oriented to support the weight of the output shaft within the housing.

The lower low speed bearing is positioned below the dry well and extends between the shaft and the relatively thick housing floor. This positioning of the lower low speed bearing below the annular wall of the dry well and at the housing base enables the relatively thick housing base to bear radial and bending moment loads exerted on the output shaft, rather than the dry well, as with some prior art reducers. Also, by positioning the lower, low speed bearing below the dry well and in the housing floor, the sizes and diameters of the bearing and adjacent section of output shaft can be increased without interfering with the gears and dry well. Another advantage of placing the lower, low speed bearing below the dry well and gearbox is that the bearing support is positioned closer to the end of the output shaft, where it is coupled to the associated mixer impeller shaft, thereby reducing the bending moment exerted on the shaft.

Preferably, the lower, low-speed bearing of the output shaft is a tapered roller bearing in which the roller bearings are angled radially outwardly and downwardly from the rotational axis of the output shaft. Therefore, this lower, low-speed bearing assembly carries the largest typical loads caused by the agitator, i.e., bending and upward thrust loads.

The output shaft preferably includes an upper segment rotatably positioned within the cylindrical dry-well and a lower segment positioned below the cylindrical dry-well and lower low-speed bearing assembly. The upper and lower segments are substantially co-axial with the dry well. The lower segment is spaced from the housing by a seal which substantially reduces the likelihood of lubricant splashing over the dry well and leaking from the housing. The lower portion of the output shaft is also preferably of a larger diameter to be coupled to an extension shaft.

The output shaft preferably is unitary in construction. This solid shaft design eliminates the need for coupling half-parts and decreases cost by minimizing the total number of components in manufacturing operations. Furthermore, the solid construction of the output shaft significantly helps to withstand bending loads and minimizes deflection of the output shaft under loading. The overall geometry of the output shaft and bearings, enables satisfactory lubricant sealing with only a small, low-cost lip seal positioned below the lower, low-speed bearing between the output shaft and the housing base. This reduces the number of components and lowers the assembly costs.

Accordingly, it is an object of the present invention to provide a parallel shaft speed reducer which better withstands large bending moments and upward thrust loads imparted to the output shaft for a reducer of its size; a reducer which is compact in design, having a relatively small footprint; a reducer in which the lower, low-speed output shaft bearing is mounted in the housing base below the dry well, thereby eliminating the need for a reinforced dry well wall; a reducer with a relatively uncomplicated and reliable lubrication and sealing system; and a reducer which is relatively easy to construct and maintain.

Other objects and advantages of the present invention will be apparent from the following description, the accompanying drawings and the appended claims.

DETAILED DESCRIPTION

Figure 1:
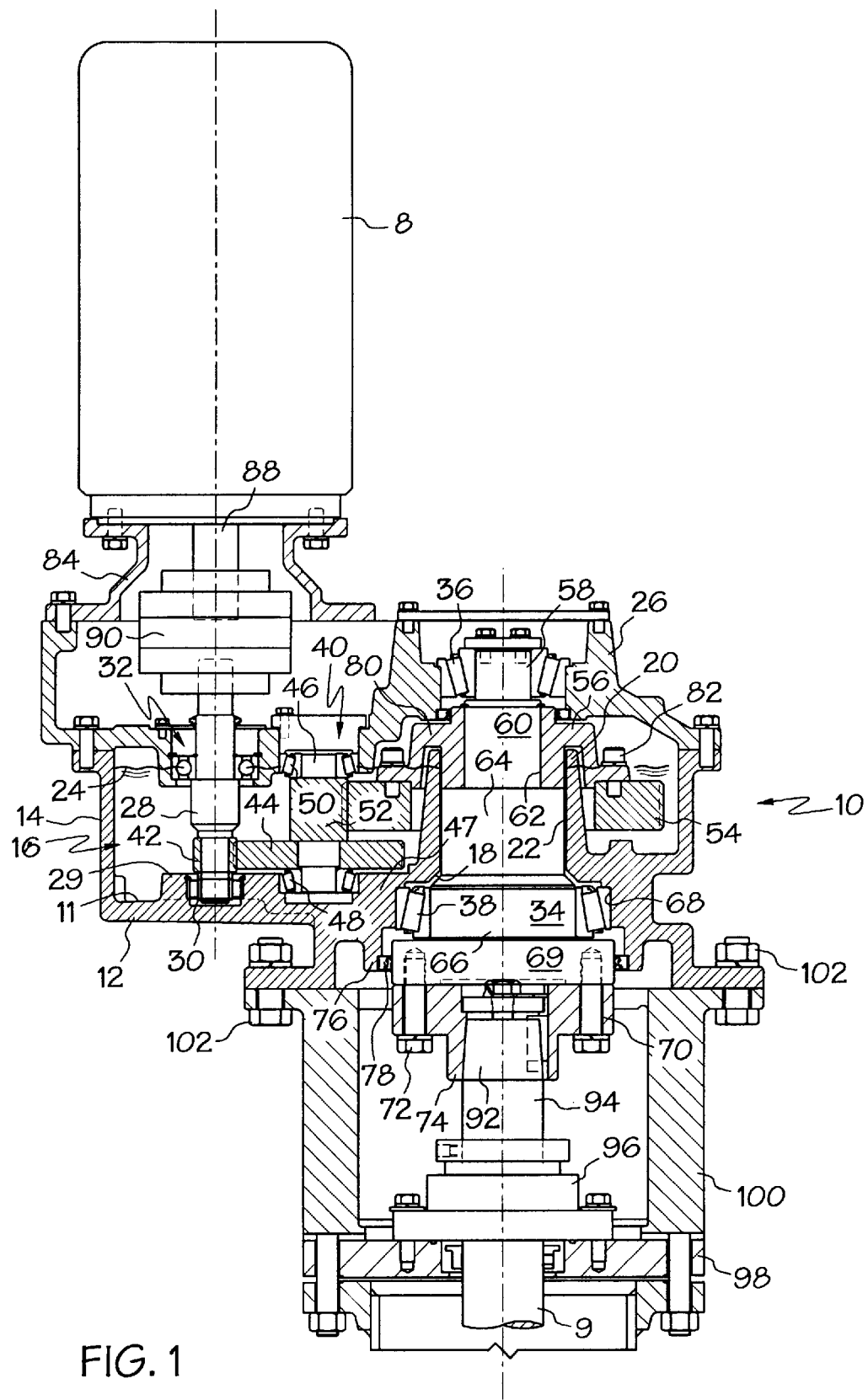
FIG. 1 is a side elevation in section of a preferred embodiment of the parallel shaft speed reducer of the present invention.
Figure 2:
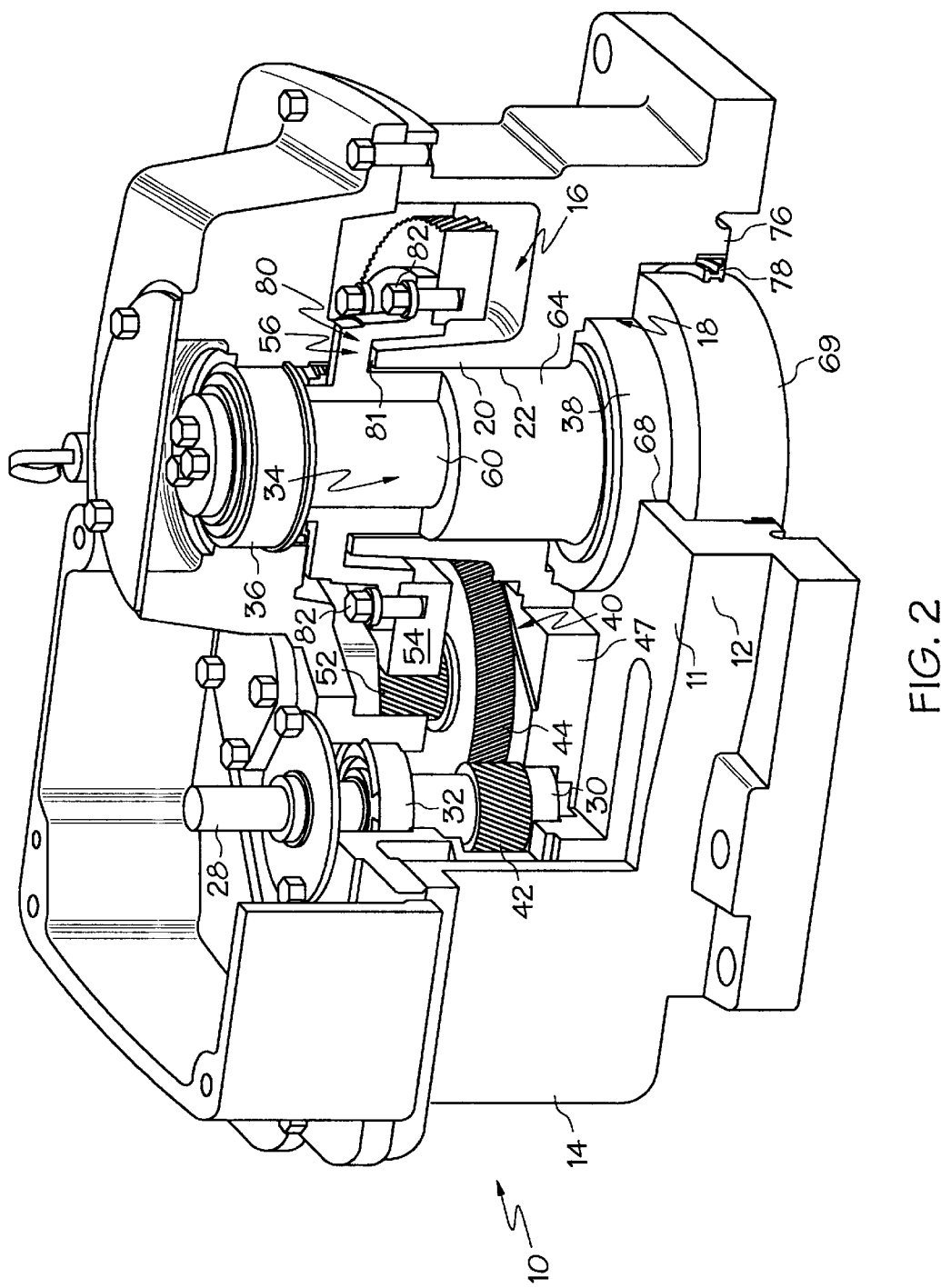
FIG. 2 is a perspective view of the reducer of FIG. 1, partially broken-away to show the shafts within the reducer housing.

As shown in FIGS. 1 and 2, a preferred embodiment of the parallel shaft speed reducer of the present invention is adapted to attach to and support a drive motor 8 and an impeller shaft 9 of a mixer. The reducer includes a gearbox housing 10 having a base or lower portion 11 which includes a floor 12 and an outer wall 14 extending upwardly therefrom, enclosing the floor 12 and forming a lubrication sump 16 therein. The base 12 includes a circular hole 18 extending therethrough and a substantially cylindrical inner wall 20 extending upwardly therefrom to form a dry well 22 within the gearbox housing. Preferably, the dry well 22 preferably is cast to be unitary with the base 11. The dry well 22 rises to a level which is substantially above the level 24 of lubricant contained in the lubrication sump 16. The floor 12 and outer wall structure 14 cast as a unitary component.

The housing 10 includes a lid or upper portion 26 removably mounted to the top of the lower portion 11. An input drive shaft 28 is positioned vertically within the housing 10 and includes a lower end received within a boss 29 formed on the floor 12 of the gearbox and supported by a lower high-speed bearing 30. The input shaft 28 is supported at its upper end by an upper high-speed bearing 32.

An output shaft 34 is positioned substantially vertically within the housing 10 parallel to the input shaft 28 and extends through the hole 18 in the base 12 of the housing. The shaft 34 is secured to the upper portion 26 of the housing 10 by an upper low-speed bearing 36. The output shaft 34 is secured to the base 12 of the housing 10 by a lower low-speed bearing 38.

A double reduction gear train, generally designated 40, is provided to couple the drive shaft 28 to the output shaft 34. The gear train 40 includes a drive pinion 42 mounted on the drive shaft 28 which engages an intermediate ring gear 44 mounted on an intermediate shaft 46. The intermediate shaft 46 is also positioned vertically within the housing 10 parallel to the input and output shafts 28, 34, respectively, and is received within a boss 47 formed in the floor 12 of the housing and secured by a lower, intermediate bearing 48 and is received within the upper portion 26 of the housing 10 by an upper, intermediate bearing assembly 50. An intermediate pinion 52 is coupled to the intermediate shaft 46 and meshes with an output ring gear 54 mounted on the output drive shaft 34 by a gear hub 56. It should be noted that it is within the scope of the invention to provide a single reduction gear train having only an input shaft meshing with and driving an output shaft, in which the input and output shafts are parallel and substantially vertical in orientation.

The output shaft 34 is supported by an upper low speed bearing 58 of a relatively small diameter which is received within the upper portion 12 of the housing 10. A gearhub section 60 of the output shaft 34 is positioned immediately below the upper bearing section is slidably received within and keyed to a central bore 62 of the gearhub 56. A dry well segment 64 of the output shaft 34 is positioned immediately below the gearhub section 60 and located substantially entirely within the dry well 22. The dry well segment 64 has a diameter sized to form a close, non-contacting fit within the dry well 22 such that there is a minimal clearance between the output shaft and the dry well at that point.

The lower low-speed bearing 38 is received within an annular recess 68 formed in the underside of the base 12 and has a diameter substantially larger than the dry well section 64 of the output shaft. A cylindrical coupling segment 69 is positioned immediately below the bearing segment 66 of the output shaft 34 and includes a plurality of circumferentially arranged, downwardly-opening threaded bores 70 shaped to receive the mounting screws 72 of a coupling bracket 74.

The upper bearing section 58, gear-hub section 60, dry well segment 64, lower bearing segment 66 and coupling segment 68 of the output shaft 34 are a solid, unitary component. This output shaft design eliminates the need for coupling segments of a shaft together and decreases the overall cost by minimizing the total number of components to be formed and joined. Furthermore, the unitary construction of the output shaft 34 enables the output shaft to withstand bending loads and minimizes deflection of the output shaft with respect to the low-speed bearing assembly 38. Because the coupling segment 68 is unitary with the solid output shaft 34, and further, due to the positioning of the coupling segment, the lower low-speed bearing 38 is located sufficiently close to the mechanical seal 96 so that a seal bearing is not required. This also reduces the number of components and lowers the assembly costs.

The location of the lower low-speed bearing assembly 38 within the relatively thick base 11 of the housing 10 allows bending loads exerted upon the output shaft to be transmitted through the low-speed bearing assembly 38 to the base, rather than to the dry well, or some other less massive component of the housing, as with prior art devices. The lower lowspeed bearing 38 preferably is a tapered roller bearing in which the roller bearings are angled radially outwardly and downwardly from the rotational axis of the output shaft to carry bending and upward thrust loads transmitted from an associated agitator (not shown). A lower annular boss 76, formed in the base 11 and coaxial with the output shaft 34, extends downwardly below the bearing 38 to receive the coupling segment 68 of the output shaft. An annular lip seal 78 is positioned between the output shaft 68 and the annular flange 76. This seal 78 eliminates the need for an expensive bearing cap.

The cylindrical portion of the gear hub 56 which extends within the dry well 22 has an outer circumferential diameter sized to provide minimal clearance between the dry well and the output shaft. The output shaft ring gear 54 is mounted on an annular flange 80 which in turn is mounted on the output shaft 26. The flange 80 is shaped to extend radially outwardly from the shaft 26 sufficiently to clear the upper edge 81 of the dry well 22, downwardly below the upper edge of the dry well, and then radially outwardly to provide a seat for receiving the ring gear 54, which is attached thereto by a plurality of bolts 82. Thus, the hub 80 is shaped to receive and form a labyrinth seal with the upper edge of the dry well 22 to contain lubricant within the housing 10.

The flange 80 extending downwardly into the lubrication sump 16 over the dry well 20 allows the ring gear 54 to be completely immersed within the lubricant, typically oil, contained within the housing 10. This, in turn, allows the intermediate pinion 52, intermediate ring gear 44 and drive pinion 42 to also be positioned below the lubricant level 24 of the lubrication the lubrication housing to allow these components to be completely immersed in the lubrication fluid. The lower, high-speed bearing assembly 30 and the lower, intermediate bearing assembly 48 are, of course, positioned below the lubricant level 24 and thus will be lubricated. The upper, high-speed bearing assembly 32 and the upper intermediate bearing assembly 50 are positioned substantially at the upper level 24 of the lubrication fluid and are in fluid communication with the lubrication sump 16 so that they will be either totally or partially immersed in lubricant. The position of the upper, low-speed bearing 36 within the housing isolates it from lubricant in the housing 10. Likewise, the dry well 22 and associated seals isolate the lower, low-speed bearing 38 from the lubrication fluid in the lubrication sump 16.

A bracket 84 is mounted to the lid 26 of the gearbox housing and is shaped to receive electric motor 8 such that output shaft 88 is coaxial with the drive shaft 28. The output shaft 88 of the electric motor 8 is coupled to the drive shaft 28 by a high-speed coupling 90.

The coupling bracket 74 receives the end 92 of a shaft 94 of a mixing apparatus. The shaft 94 extends through the process seal 96 mounted on a mounting flange 98 which, in turn is attached to the posts 100 of the mixer seal pedestal. The mixer seal pedestal 100 is attached to the reducer housing 10 by mounting bolts 102.

While the form of apparatus herein described constitutes a preferred embodiment of the invention, it is to be understood that the invention is not limited to this precise form of apparatus, and that changes may be made therein without departing from the scope of the invention.

What is claimed is:

1. A speed reducer comprising:
    a gearbox housing having a base and an and an outer wall extending up from and enclosing the base to form a lubricant sump, the base having a hole and an inner wall surrounding the hole and extending upwardly into the lubricant sump to provide a dry well;
    a substantially vertically oriented input drive shaft rotatably mounted within the gearbox housing and extending below an upper surface of lubricant in the lubricant sump and adapted to be rotatably driven by a motor;
    a substantially vertically oriented output shaft connected to be rotatably driven by the input shaft, the output shaft being positioned to extend through the dry well and outwardly from an underside of the base;
    an upper output shaft bearing mounted in the gearbox housing and supporting an upper portion of the output shaft; and
    a lower output shaft bearing mounted in the base beneath the dry well and supporting a lower portion of said output shaft;
    the base including a recess below and concentric with the dry well, the lower output bearing being mounted within the recess; and
    the lower output bearing being larger in diameter than the upper output shaft bearing;
    whereby thrust and bending loads applied to the output shaft are transmitted through the lower bearing to the base.

2. The reducer of claim 1 wherein the dry well is unitary with the base.

3. The reducer of claim 1 wherein the output shaft is substantially parallel to the input shaft.

4. The reducer of claim 1 wherein the upper output shaft bearing is mounted on the upper portion of the housing above the lubricant sump.

5. The reducer of claim 1 wherein the output shaft includes a lower bearing section engaging the lower output shaft bearing, the lower bearing section having a larger diameter than a portion of the output shaft extending above the lower bearing section.

6. The reducer of claim 1 further comprising an intermediate shaft mounted within said gearbox housing to be rotatably driven by said input shaft and rotatably driving said output shaft.

7. The reducer of claim 1 wherein the intermediate shaft is positioned below the upper surface of lubricant.

8. A speed reducer comprising:
a gearbox housing having a base and an and an outer wall extending up from and enclosing the base to form a lubricant sump, the base having a hole and an inner wall surrounding the hole and extending upwardly into the lubricant sump to provide a dry well;
a substantially vertically oriented input drive shaft rotatably mounted within the gearbox housing and extending below an upper surface of lubricant in the lubricant sump and adapted to be rotatably driven by a motor;
a substantially vertically oriented output shaft connected to be rotatably driven by the input shaft, the output shaft being positioned to extend through the dry well and outwardly from an underside of the base;
an upper output shaft bearing mounted in the gearbox housing and supporting an upper portion of the output shaft; and
a lower output shaft bearing mounted in the base beneath the dry well and supporting a lower portion of said output shaft;
the output shaft being unitary and including a relatively large diameter coupling segment positioned below the lower output shaft bearing; and
the base further including an annular boss extending downwardly from the underside of the base adjacent to and concentric with the coupling segment.

9. The reducer of claim 8 further comprising an annular lip seal positioned between the annular boss and the coupling segment.

10. The speed reducer of claim 8, wherein the base further includes an annular flange extending downwardly from the underside of the base adjacent to and concentric with the annular boss, the flange extending downward beyond the coupling segment.

11. A speed reducer comprising:
a gearbox housing having a base and an outer wall extending up from and enclosing the base to form a lubricant sump, the base having a hole and an inner wall, unitary with the base, surrounding the hole and extending upwardly into the lubricant sump to provide a dry well, the base including a recess below and concentric with the dry well;
a substantially vertically oriented input drive shaft rotatably mounted within the gearbox housing and extending below an upper surface of lubricant in the lubricant sump and adapted to be rotatably driven by a motor;
a substantially vertically oriented output shaft, substantially parallel to the input shaft, connected to be rotatably driven by the input shaft, the output shaft being positioned to extend through the dry well and outwardly from an underside of the base;
an upper output shaft bearing mounted on the upper portion of the gearbox housing above the lubricant sump and supporting an upper portion of the output shaft; and
a lower output shaft bearing mounted in the base recess beneath the dry well and supporting a lower portion of said output shaft, the lower output shaft bearing being larger in diameter than the upper output shaft bearing;
the output shaft being unitary in construction and including a relatively large diameter coupling segment positioned below the lower output shaft bearing, and having a lower bearing section engaging the lower output shaft bearing, the lower bearing section having a larger diameter than a portion of the output shaft extending above the lower bearing section;
the base further including an annular boss extending downwardly from the underside of the base adjacent to and concentric with the coupling segment and an annular lip seal positioned between the annular boss and the coupling segment;
the output shaft including a substantially cylindrical shaft body; a gear hub mounted on the shaft body below the upper output shaft bearing and including a segment extending radially outwardly over an upper end of the dry well and then downwardly below the upper end of the dry well into the lubricant sump; and
a ring gear mounted on an outer periphery of the hub within the sump and rotatably driven by an input gear carried by the input drive shaft and positioned within the lubricant sump;
whereby thrust and bending loads applied to the output shaft are transmitted through the lower bearing to the base.

12. The reducer of claim 11 further comprising an intermediate shaft mounted within said gearbox to be rotatably driven by said input shaft and rotatably driving said output shaft.

13. The reducer of claim 12 wherein the intermediate shaft is positioned below the upper surface of the lubricant in the lubricant sump.

14. A speed reducer comprising:
a gearbox housing having a base and an and an outer wall extending up from and enclosing the base to form a lubricant sump, the base having a hole and an inner wall surrounding the hole and extending upwardly into the lubricant sump to provide a dry well;
a substantially vertically oriented input drive shaft rotatably mounted within the gearbox housing and extending below an upper surface of lubricant in the lubricant sump and adapted to be rotatably driven by a motor;
a substantially vertically oriented output shaft connected to be rotatably driven by the input shaft, the output shaft being positioned to extend through the dry well and outwardly from an underside of the base;
an upper output shaft bearing mounted in the gearbox housing and supporting an upper portion of the output shaft; and
a lower output shaft bearing mounted in the base beneath the dry well and supporting a lower portion of said output shaft;
the output shaft including a substantially cylindrical shaft body, a gear hub mounted on the shaft body and including a segment extending radially outwardly over an upper end of the dry well and then downwardly below the upper end of the dry well into the lubricant sump, and a ring gear mounted on an outer periphery of the hub within the lubricant sump and rotatably driven by an input gear carried by the drive shaft and positioned within the lubricant sump.

15. The reducer of claim 14 wherein the gear hub is mounted on the output shaft below the upper output shaft bearing.

16. A speed reducer comprising:
a gearbox housing having a base and an and an outer wall extending up from and enclosing the base to form a lubricant sump, the base having a hole and an inner wall surrounding the hole and extending upwardly into the lubricant sump to provide a dry well;
a drive shaft extending into the gearbox housing;
an output shaft extending through the circular hole and into the gearbox housing, coupled for simultaneous rotation to the drive shaft by a gear train, the output shaft having a rotational axis;

a lower output shaft bearing mounted in the base and supporting a lower portion of the output shaft, the lower output shaft bearing including a plurality of circumferentially arranged, tapered roller bearings, the roller bearings being angled radially outwardly and downwardly from the rotational axis of the output shaft, whereby bending and upward thrust loads applied to the output shaft are transmitted through the lower output shaft bearing to the base.

17. The speed reducer of claim 16, wherein:

the dry-well is substantially cylindrical;

the output shaft includes an upper segment positioned within the cylindrical dry-well and a lower bearing segment positioned below the cylindrical dry-well and journaled by the lower output shaft bearing;

the diameter of the upper segment being substantially equal to the diameter of the inner circumferential surface of the dry-well and the diameter of the bearing segment being substantially larger than the diameter of the upper segment.

18. The speed reducer of claim 17, wherein:

the output shaft further includes a coupling segment, positioned immediately below the bearing segment, the coupling segment being adapted to be coupled to an extension shaft; and the upper segment, bearing segment and coupling segment of the output shaft are a solid, unitary component.

19. The speed reducer of claim 18, wherein the base of the gear box includes an annular flange extending downward therefrom, at least partially encircling the coupling segment of the output shaft.

20. The speed reducer of claim 19, further comprising an annular seal positioned between the coupling segment of the output shaft and the annular flange extending downward from the base of the gearbox.

21. The speed reducer of claim 20, wherein the base, the outer wall, the inner wall and the annular flange of the gearbox are a solid, unitary component.

22. A speed reducer comprising:

a gearbox housing having a base and an and an outer wall extending up from and enclosing the base to form a lubricant sump, the base having a hole and an inner wall surrounding the hole and extending upwardly into the lubricant sump to provide a dry well, the inner wall having a height above a level of lubricant contained in the lubricant sump;

a vertical drive shaft extending into the gearbox housing;

an output shaft extending through the circular hole and into the gearbox housing, parallel with the drive shaft and coupled for simultaneous rotation to the drive shaft by a gear train;

an upper output shaft bearing mounted in the gearbox housing supporting an upper portion of the output shaft;

a lower output shaft bearing mounted in the base beneath the dry well and supporting a lower portion of the output shaft so that bending loads applied to the output shaft are transmitted through the lower output shaft bearing to the base;

an upper drive shaft bearing mounted in the gearbox housing, supporting an upper portion of the drive shaft and positioned to be at least partially immersed in lubricant contained in the lubricant sump; and a lower drive shaft bearing mounted in the base and supporting a lower portion of the drive shaft;

the upper and lower drive shaft bearings being in fluid communication with the lubrication sump whereby the upper and lower drive shaft bearings are lubricated by lubricant contained in the lubricant sump.

23. A speed reducer comprising:

a gearbox housing having a base and an outer wall extending up from and enclosing the base to form a lubricant sump, the base having a hole and an inner wall surrounding the hole and extending upwardly into the lubricant sump to provide a dry well, the inner wall having a height above a level of lubricant contained in the lubricant sump;

a vertical drive shaft extending into the gearbox housing;

an output shaft extending through the circular hole and into the gearbox housing, parallel with the drive shaft and coupled for simultaneous rotation to the drive shaft by a gear train;

an upper output shaft bearing mounted in the gearbox housing supporting an upper portion of the output shaft; and a lower output shaft bearing mounted in the base, beneath the dry well, and supporting a lower portion of the output shaft;

the gear train including a drive pinion carried on the drive shaft and an output ring gear carried on the output shaft, the drive pinion and the output ring gear being positioned within the lubrication sump, below the height of the inner wall so that the drive pinion and output ring gear are immersed in the lubricant contained in the lubrication sump.

24. A speed reducer comprising:

a gearbox housing having a base and an and an outer wall extending up from and enclosing the base to form a lubricant sump, the base having a hole and an inner wall surrounding the hole and extending upwardly into the lubricant sump to provide a dry well;

a substantially vertically oriented input drive shaft rotatably mounted within the gearbox housing and extending below an upper surface of lubricant in the lubricant sump and adapted to be rotatably driven by a motor;

a substantially vertically oriented output shaft connected to be rotatably driven by the input shaft, the output shaft being positioned to extend through the dry well and outwardly from an underside of the base;

an upper output shaft bearing mounted in the gearbox housing and supporting an upper portion of the output shaft; and a lower output shaft bearing mounted in the base beneath the dry well and supporting a lower portion of said output shaft;

the output shaft being unitary and including a relatively large diameter coupling segment positioned below the lower output shaft bearing, the coupling segment not extending downward beyond a lower-most portion of the base.

25. The speed reducer of claim 24 wherein the lower-most portion of the base is an annular flange, concentric with and surrounding the coupling segment.

* * * * *